June 26, 1956  J. A. ROOK  2,751,928
LIQUID LEVEL CONTROL RESERVOIR
Filed Feb. 25, 1952  2 Sheets-Sheet 1

INVENTOR.
JAMES A. ROOK
BY
Howard L. Johnson
ATTORNEY.

INVENTOR.
JAMES A. ROOK
BY
Howard L. Johnson
ATTORNEY

United States Patent Office 2,751,928
Patented June 26, 1956

2,751,928

LIQUID LEVEL CONTROL RESERVOIR

James A. Rook, Los Angeles, Calif.

Application February 25, 1952, Serial No. 273,325

7 Claims. (Cl. 137—453)

This invention relates to a detachable, refillable reservoir unit adapted to be mounted atop a liquid container such as a storage battery so as automatically to maintain a constant level of liquid in the lower container, as well as to make evident to the user at a glance the relative need of refilling the reservoir. Such units fill a particular need, for example, in relation to automobile storage batteries, the level of water in which can otherwise only be ascertained by removing the battery plug and peering in. If this latter is done by the operator en route such action is still unavailing if it discloses the need for addition of distilled water when none is available. On the other hand, when at a service station where a supply of water would be available one often overlooks checking the battery since additional water obviously is not required each time one stops.

A particular feature of the present reservoir resides in an arrangement whereby changes in the specific gravity of liquid in an automobile storage battery to which it is attached, are indicated to an observer. Since such changes in the battery fluid correspond to its effectiveness or potential power left in the battery, the operator can see at a glance whether the battery is adequately charged or run down and in need of attention.

Accordingly my unit serves both to carry a supply of liquid which is automatically fed into the battery or other container to maintain a constant liquid level therein, and also to indicate to the user the quantity of reserve liquid remaining in the reservoir without requiring removal of any cover or structure. The result is accomplished without sealing off the battery compartment from the atmosphere and while maintaining the reservoir contents safe from outside contamination.

One form of my device is formed of compressible walls so as to be fillable like a syringe. Another form is provided with a top inlet opening and means for temporarily shutting off the drip outlet such as may be desirable when the unit is in an unmounted position, and also when filling the same with the unit mounted on a battery thus to prevent it rapidly running out. However, particular optional features as compressible (syringe) walls, transparent walls with or without floats within, stoppered top inlet with or without lower outlet closures can all be combined in one construction.

It is within the province of the disclosure to improve generally, and to enhance the utility of devices of that type to which the invention appertains.

With the above and other objects in view, which will appear as the description proceeds, the invention resides in the combination and arrangement of parts and in the details of construction and operation hereinafter described and claimed, it being understood that changes in the precise embodiments of the invention herein disclosed may be made within the scope of what is claimed, without departing from the spirit of the invention.

In the drawings, which form part of the present specification:

The invention is here illustrated in association with a fluid container A having an internally threaded boss 10 normally adapted to receive a sealing plug (not shown) and the aperture of which serves as an inlet to fill the container with any desired liquid from time to time. Such a container is particularly exemplified by an automobile battery, each cell of which is thus separately constructed and accordingly the battery will mount as many of my reservoir units B as it has cells. However other fluid containers, such as the oil container of an engine, can similarly use my reservoir units to simultaneously indicate the quantity of reserve liquid in the reservoir and to automatically maintain at a constant level the liquid being used up in the lower container; at the same time it can signal changes in the specific gravity of the lower liquid—such as due to acid formation—if desired.

Figure 1:
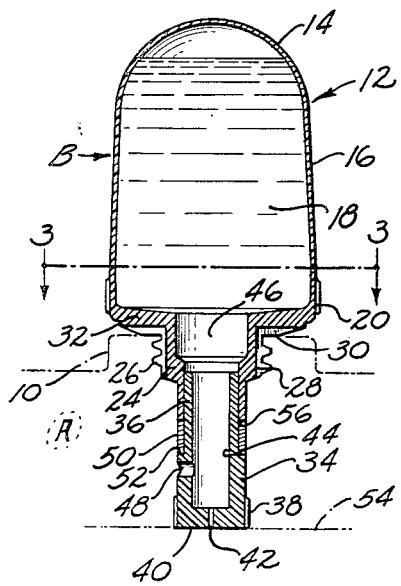
Figure 1 is a vertical sectional view taken along the line 1—1 of Figure 2 thru one form of my liquid reservoir, shown mounted atop an automobile battery partially indicated in broken lines.
Figure 2:
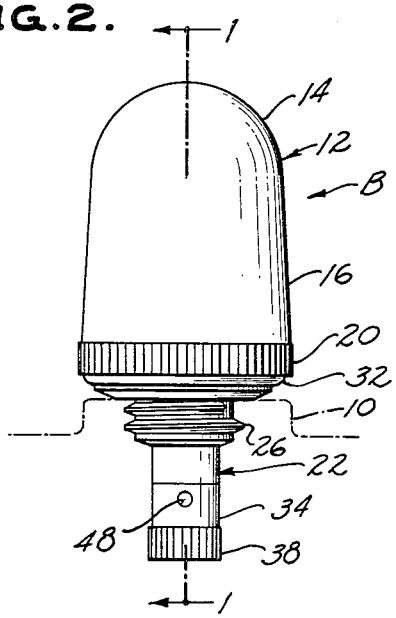
Figure 2 is a corresponding side elevational view of the reservoir unit with the separable sleeve removed from the dependent stem to allow the latter to be located at its uppermost position.
Figure 3:
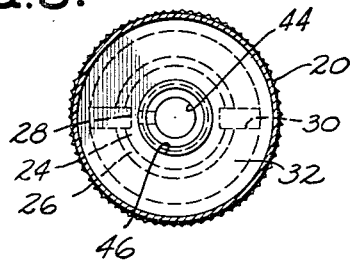
Figure 3 is a horizontal sectional view taken thru the reservoir of Figure 1 as viewed along the line 3—3.

As depicted in Figs. 1-3, there is provided a bulbous member or chamber 12 having a dome-shaped top 14 and generally cylindrical side walls 16, all formed of light-transmitting, compressible plastic material such as polyethylene so that the level of liquid 18 therein can be readily seen from the exterior and the bulb can be squeezed like a syringe from time to time to fill the same when removed from the container A. The annular base of the walls 16 is provided with peripheral flutings 20 to enable it to be grasped between the operator's fingers more easily, and below this the unit is radially restricted to form a dependent, tubular, generally concentric stem 22.

The upper portion 24 of the stem is formed with external screw threads 26 adapted to engage the corresponding threads of the boss 10 so as to mount the same on the container A. However, one or more vertical grooves 28 are cut thru the threads and continued outward 30 along the underface of the chamber bottom 32 so as to provide a vent for the interior of the container A at all times.

A tubular insert 34 is provided to form a lower extension to the body of the stem 22, being formed with an upper restricted neck portion 36 adapted to be snugly but removably inserted partway within the lower end of the stem 22. The other end of the cylindrical insert is formed with external flutings 38 for grasping; and the closed bottom 40 is traversed by a comparatively small opening 42 leading into the central passage 44 which in turn communicates with the interior 46 of the upper stem and the main body of liquid 18. Vertically spaced above the bottom 40 of the insert there is located a lateral opening 48 into the passage 44, while immediately thereabove is a removable sleeve 50 slidingly mounted over the neck 36 from the top downward until it abuts against an external shoulder 52 of the inlet.

In practice, the unit B, filled with liquid, is screwed into the tapped opening of the boss 10 so that the tube bottom 40 touches or is slightly immersed in the liquid 54 of the container A, and the lateral outlet 48 is above the liquid level. In order to accommodate batteries or the like having a high liquid level in relation to the boss 10, the insert 34 is first withdrawn from the upper stem 24, the sleeve 50 removed, and the insert reinserted up to a position at which the edge 56 abuts against the shoulder 52. As the liquid level 54 starts to recede from the bottom 40 it will automatically draw liquid out of the reservoir 18, the latter being replaced by air entering thru the side opening 48 so that the level 54 will be maintained constant as long as there is liquid in the reservoir 18. At the same time, the operator can see by a casual glance from time to time, whether the reservoir will soon need refilling or how fast the liquid is being consumed.

Figure 4:
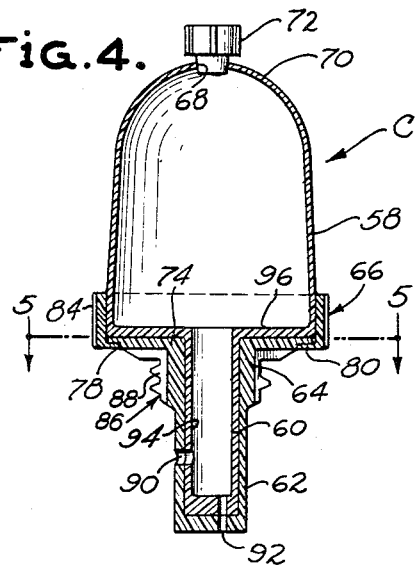
Figure 4 is a vertical sectional view of another form of liquid reservoir, similarly mounted.
Figure 5:
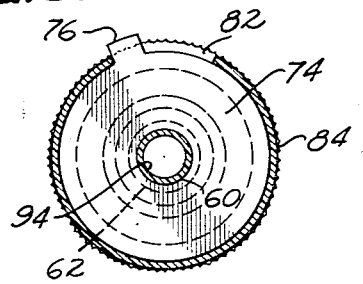
Figure 5 is a horizontal sectional view taken thru the reservoir of Figure 4 as indicated by the line 5—5.

In the form shown in Figs. 4–5, the reservoir unit C is formed of three parts: (1) the reservoir proper 58 with a dependent tubular stem 60 conveniently formed integral therewith; (2) an outer tubular stem 62 and upper attachment section 64; and (3) an annular, flanged collar 66 which serves to hold parts (1) and (2) together in a position of limited relative movement. The whole can be made of organic plastic or the like, at least the reservoir itself 58 desirably being made of light-transmitting material so that the liquid level inside is readily ascertained.

The reservoir can be made compressible as in the previous form so as to be filled by suction thru the stem, or an inlet opening 68 can be made in the dome 70, provided with a removable closure or stopper 72. This construction permits the reservoir to be filled without detaching it from the fluid container A. Or in the alternative, the construction of the pair of concentric stems 60, 62 hereafter described, permits the lower openings to be closed so that liquid does not drain out when the unit is removed from the container A.

The separate, lower member is formed of a flat-topped disk 74 having an operating finger or lever 76 projecting outward from an edge thereof. The disk is undercut at 78 around its lower face to form a track in which the inturned flange 80 of the attachment collar 66 is received, the finger 76 in turn extending thru an arcuate slot 82 (Fig. 5) formed along the bottom edge of the vertical wall 84 of the collar. The upper attachment section 64 is formed with external screw threads 86 which as in the earlier form are vertically slotted at 88 to provide an air vent. Two openings are then drilled thru both stems 60, 62, the lateral horizontal air inlet 90 and the bottom, liquid outlet 92, the latter being located eccentric to the axes of the stems and of the inner fluid channel 94.

Accordingly it will be seen that by rotating the outer stem 62 about the inner stem 60 thru a short arc, the two holes in the one stem will be moved out of alignment with the corresponding holes in the other stem, thus closing off the channel 94 from the exterior. In assembly, the upright wall 84 of the collar 66 is cemented or otherwise attached to the outer face of the reservoir wall 58, and the extent of rotational movement of the lower member 62, 64 about the inner stem 60 corresponds to the movement of the finger 76 in the slot 82. The upper face of the disk 74 loosely slides over the under surface of the bottom wall 96 of the reservoir or there can even be a small clearance between the two, the disk 74 and its dependent structures being supported in sliding engagement on the collar flange 80.

Thus, even with the stopper 72 out, the unit C, after manipulation of the finger 76 can be taken off and put back on the battery or other container C without the contained liquid escaping thru the bottom outlet.

It will be seen that without a top inlet 68 the reservoir B, C must be compressible so as to be filled by suction upon removal from the battery. With a top closure 72 (which of course must form an air-tight seal), desirably there are closure means for the two lower stem openings 90, 92 so that they don't drain off the liquid when the stopper 72 is removed. However the lower closures can be omitted, as in the modifications of Figs. 6–8, and the operator can merely hold a finger over the lower openings when filling the reservoir thru the top. In such event, the reservoir walls should be compressible so that the liquid which runs out of the lower openings into the battery during the time that the unit is being screwed into place, can be sucked back into the reservoir after the stem bottom 40 has touched the liquid surface in the battery. On the other hand, it will be apparent that the dome inlets 108 can be omitted from the constructions of Figs. 6–8 and their reservoirs filled entirely by suction.

Figure 6:
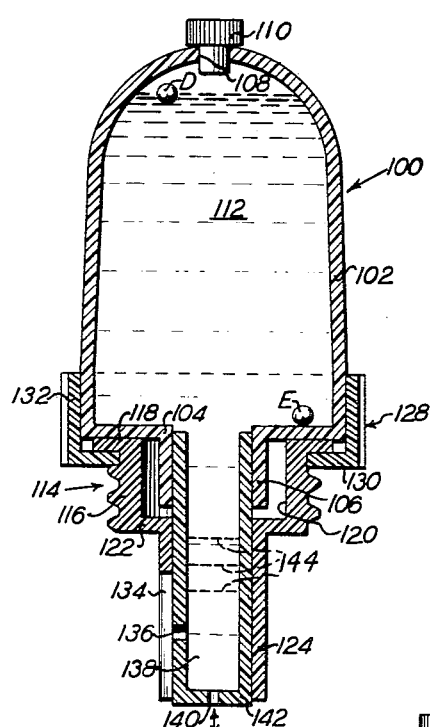
Figure 6 is a vertical sectional view taken thru a further modification showing a four-piece construction with a removable outlet tube.

In the form shown in Figure 6, the liquid chamber 100 has its sides 102, bottom 104 and dependent tubular outlet 106 formed in one piece, desirably of transparent and resilient material. It may be formed with a dome inlet 108 and stopper 110 for convenience of filling with liquid while the bottom openings are held closed by the operator; or in the alternative, the liquid 112 can be drawn in thru the bottom opening by syringe action upon squeezing together and releasing the compressive side walls 102.

For attachment in the tapped bore of an auto battery or the like, there is provided a coupling unit 114 comprising a cylindrical, externally threaded collar 116 having an upper, outward extending flange 118 adapted for frictional abutment against the underface of the container bottom 104. The inner wall 120 of the collar is spaced outward from the tubular conduit 106 for a vertical distance somewhat greater than the length of the tube, below which it forms a horizontal disk 122 having a dependent, open-bottomed extension 124 of similar inner radius to and axially aligned with the tube 106 of the chamber. As before, the collar 116 is provided with an upright channel or slot formed across its threaded surface (126, Fig. 8) so as to freely vent the air space of the interior of the container or galvanic cell upon which the reservoir is mounted.

A generally L-shaped collar 128 having an inwardly directed annulus 130 and vertically fluted upright side walls 132 serves to hold together the chamber 100 and coupling unit 114 by lodgment of the inner edge of the annulus 130 beneath the flange 118. Desirably the upright walls 132 are slightly tapered convergingly upward so as to snugly engage the adjacent reservoir wall 102. However, suitable cement or adhesive may be placed around the inner face of the side wall 132 so as to ensure a permanent attachment of the chamber 100 and collar 128 if desired.

However, the horizontal flange 118 is desirably rotatably slidable in its location between the reservoir bottom 104 and the annulus 130 so as to permit a vertical open-bottom slot 134 formed therein to be selectively aligned with a lateral air-inlet 136 of a cylindrical open-topped insert 138 which is received jointly and more-or-less snugly respectively in the reservoir tube 106 and the dependent extension 124 of the coupling unit. This flat-bottomed insert 138 is formed with a small liquid outlet 140, thru which the reservoir contents 112 drop as the liquid level in the galvanic cell or the like A tends to fall or draw away from contact with the cylinder bottom 142. As a drop of liquid passes out the opening 140, a corresponding bubble of air enters the side inlet 136 and rises thru the insert 138 and reservoir 102 to the top.

A particular advantage of this construction resides in the easy adaptability of the insert or contact cylinder 138 to various (permanent) heights or liquid levels in the container upon which the reservoir is mounted. Thus, for example, there are "high level" and "low level" batteries; that is, batteries wherein the liquid level is respectively closely adjacent and further below the particular galvanic cell closure. For a "high level" battery, only a short tube (138) is required and accordingly the insert is conveniently formed with external, circumferential score lines 144 (Fig. 8) for ease of cutting off sections from the top or open end so as to shorten the same. The shortened insert 138 can then be pushed up to the desired level within the outer tube 124 until the air inlet 136 stands level with the upper end of the slot 134. Further, by raising the insert a little above this position or else by rotating it slightly so as to disalign the opening 136 with the slot 134, the reservoir can be handled (when tightly stoppered) without the liquid running out of the bottom opening 140. When the reservoir unit has been dismounted from its battery, it is filled at the top 108 by holding a finger on outlet 140.

Of particular importance when my reservoir units are employed on auto batteries and the like, are a pair of floats D, E which are placed in each liquid chamber and are visible thru its transparent walls. Desirably the floats are of contrasting colors so as to be readily distinguishable. The two floats are constructed so as to have different specific gravities and thus visually indicate— by reason of their being in a floating or sunken position —the changes of specific gravity taking place in the surrounding liquid. In the case of the water (18, 112) in the reservoir, its specific gravity changes with the aging or use of the auto battery on which it is mounted, similar to the change in the specific gravity of the water in the auto battery itself. This latter varies from a specific gravity of about 1090 to 1100 (when the battery is exhausted) to a maximum of about 1280 to 1300 (when the battery is fully charged).

Accordingly the two indicators D, E are made so as to both float when the battery is fully charged. When the specific gravity drops below, say, 1240 (50% charged) one ball E, say green, sinks as a warning to the motorist. When the specific gravity subsequently falls further to, say, 1200 (25% charged) the other ball, say red, drops to the bottom of the reservoir showing that the battery needs immediate attention. Altho the reservoir water may be mixed with the battery water by syringe action (repeatedly squeezing and releasing the compressible reservoir walls), for example immediately upon mounting the reservoir on a battery, such liquid interchange is usually unnecessary as the reservoir water soon assumes the specific gravity of that in the galvanic cell—e. g. upon driving the auto a few miles. (This is probably due in part to entrance of acid fumes from the battery into the reservoir liquid thru the air inlet 136.) At any rate, the floats reflect with reasonable accuracy the changes taking place in the strength of the battery, whether from non-use, charging by the generator, short circuit, or from other causes.

Of course any number of floats may be used, as well as only one, and they can be constructed to drop at any desired specific gravity. Likewise they can be attached to an external indicator as when opaque side walls are used on the reservoir. Such floats are conveniently made of conventional material such as organic plastic, glass, natural or synthetic rubber, acid-resistant wood or metal, etc. The desired specific gravities may be inherent in the selected material, or can be imparted to the float by incorporation of air bubbles or weights as required.

Figure 7:
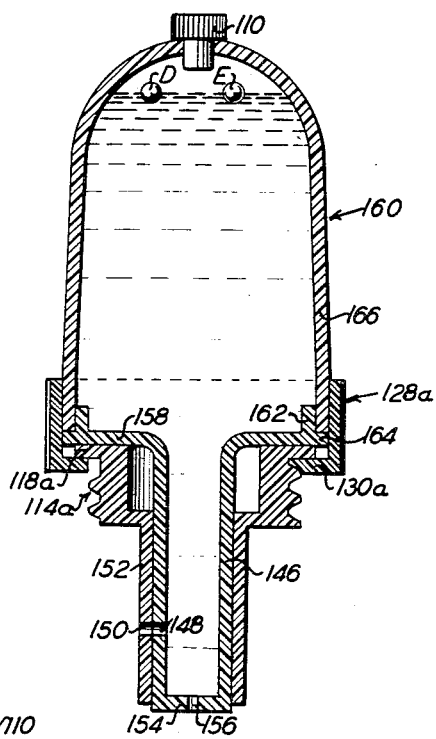
Figure 7 is a similar view of still another modified form.

Another modified construction is shown in Figure 7. Like Figure 6, it is formed of four pieces (exclusive of the stopper) but with its inlet cylinder 146 a constant length so as permanently to dispose the lateral inlet 148 in the same horizontal plane as the corresponding opening 150 in the outer tube 152. Rising from a flat bottom 154 with its drip outlet 156 similar to those earlier described, the open-topped cylinder 146 flares outward at its upper extremity to form a disk shaped bottom 158 for the reservoir 160. Spaced inward from the edge of the upper face, a short upward extending wall 162 serves to delineate an annular footing portion or ledge 164 of the disk so as jointly with the collar 128a to form a housing slot within which is received the lower edge of the bulb or reservoir 166. The coupling unit 114a is similar to that of the preceding form except for the lateral opening 150 in place of the previous slot 134, the flange 118a being rotatably supported upon the annulus 130a so as to permit closing the inlet 148 when the unit is dismounted from an auto battery.

Figure 8:
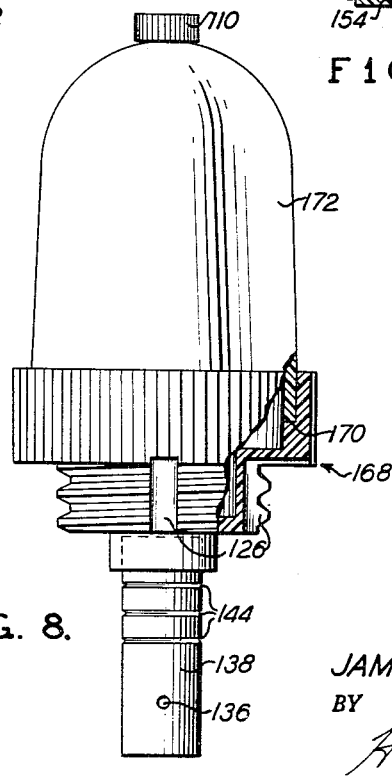
Figure 8 is a side elevational view of a further modification which employs the outlet tube of Figure 6.

A still further modification is illustrated in Figure 8 which employs the inner cylinder 138 of Figure 6 without the corresponding long outer cylinder (124, 152). The previous collar 128 and coupling unit 114 are formed integral 168 with a step 170 cut out about the inner face of the latter to receive the reservoir proper 172. With this simpler construction, there is no way to shut off the lateral inlet 136 when dismounting from a battery, but the operator can merely hold a finger over it and the bottom outlet when filling the reservoir thru an unstoppered top. Or the reservoir can be filled without removing the stopper, by syringe action when the side walls 172 are formed of compressible rather than rigid material. If desired, the stopper 110 and its corresponding opening can thus be omitted and the floats D, E inserted in the reservoir thru the bottom upon temporary removal of the cylinder 138.

While I have herein shown and described my invention in what I have presently conceived to be the most practical and preferred embodiments it is recognized that departures may be made therefrom within the scope of my invention, which is not to be limited to the details disclosed herein, but is to be accorded the full scope of the claims so as to embrace any and all equivalent devices.

The invention having been herein described, what I claim as new and desire to secure by Letters Patent is:

1. A reservoir unit for maintaining a constant liquid level in a threaded-aperture liquid container of the type adapted to contain air above its liquid level comprising, in combination: walls containing a closed liquid reservoir; an apertured flange portion disposed beneath said reservoir, said portion being provided with external screw threads for mounting on such container; a generally L-shaped collar portion disposed to secure said reservoir and flange portion; a tubular cylindrical stem disposed in said flange aperture, dependent from said reservoir with its interior in communication therewith, said stem being formed with a generally horizontal bottom wall having an eccentric opening therein adapted to be disposed below the surface of liquid in such container so as to serve as an outlet for the reservoir thereto, said stem being formed with a lateral opening therein spaced vertically above said bottom opening for admission of air to the reservoir from such container to balance withdrawal of liquid through said bottom opening; and outer concentric tubular stem having side and bottom walls disposed in rotatable frictional registration with the corresponding walls of said dependent stem, said outer stem being formed with lateral and eccentric bottom openings corresponding to those of said dependent stem and alignable therewith by rotation; and externally operable means for rotating one of said stems with respect to the other stem on a common longitudinal, substantially vertical axis to and from positions of alignment of the corresponding lateral and bottom eccentric openings so as respectively to permit the flow and to stop the flow of liquid from said reservoir into such container.

2. In combination with a closed reservoir unit of the character described, having a generally vertical dependent outlet member, the improvement wherein said member comprises a cylindrical, flat-bottomed tube formed with an eccentric bottom liquid outlet and a lateral air inlet spaced vertically thereabove; an outer cylindrical tubular stem disposed concentric with said tubular member and rotatable with respect thereto along a common longitudinal axis, said stem being formed with a bottom liquid outlet and lateral air inlet correspondingly spaced to those of said member and adapted selectively to be disposed in alignment therewith; and manually operable means carried by the reservoir unit for rotatively aligning and disaligning the tubular member and stem to and from a position wherein their respective liquid and air openings are in functional alignment, whereby passage of liquid out of the reservoir may be selectively controlled.

3. A reservoir unit for maintaining a constant liquid level in a lower body of liquid comprising, in combination: walls defining a closed liquid reservoir having a dependent tubular stem with a closed bottom, the interior of said stem being in communication with the reservoir; an outer tubular stem having a closed bottom, the inner walls of said last stem and bottom being disposed in juxtaposition to the corresponding walls of the inner stem and rotatable thereabout on a longitudinal axis, said two stems being formed with a bottom aperture passing jointly therethru eccentric to said longitudinal axis, and a lateral opening formed jointly thru said stem spaced vertically above the bottom opening; attachment means for mounting the reservoir unit above the body of liquid while allowing access of air to the latter and with the bottom of said outer stem in contact with the liquid body; and means for holding together the reservoir and the outer stem while permitting relative rotation of one stem in respect to the other, whereby the corresponding bottom apertures and lateral openings of the respective stems may be moved to and from positions of alignment so as respectively to permit the flow and stop the flow of liquid from the reservoir through the bottom apertures.

4. A reservoir unit for maintaining a constant liquid level in a lower body of liquid comprising, in combination: walls defining a closed liquid reservoir having a dependent tubular stem with a closed bottom, the interior of said stem being in communication with the reservoir; an outer tubular stem having a closed bottom, the inner walls of said last stem and bottom being disposed in juxtaposition to the corresponding walls of the inner stem and rotatable thereabout on a longitudinal axis, said two stems being formed with a bottom aperture passing jointly therethru eccentric to said longitudinal axis, and a lateral opening formed jointly thru said stems spaced vertically above the bottom opening; and apertured disk supported above said outer stem in juxtaposition to the bottom of said reservoir and carrying attachment means for mounting the reservoir unit above the body of liquid while allowing access of air to the latter and with the bottom of said outer stem in contact with the liquid body; and a collar having a lower inturned flange for holding together the reservoir and the outer stem while permitting relative rotation of one stem in respect to the other, said disk having an outwardly projecting operating lever extending thru a lateral slot formed in said collar whereby said relative movement of a stem may be manually effected, and the corresponding bottom apertures and lateral openings of said stems may be moved to and from positions of alignment so as respectively to permit the flow and to stop the flow of liquid from the reservoir through the bottom apertures.

5. In combination with a closed reservoir unit of the character described, having a generally vertical dependent outlet member, the improvement wherein said member comprises a cylindrical, flat-bottomed tube formed with a bottom liquid outlet and a lateral air inlet spaced vertically thereabove; an outer cylindrical tubular stem disposed concentric with said tubular member and rotatable with respect thereto along a common longitudinal axis, said stem being formed with a lateral air inlet correspondingly spaced to that of said member and adapted selectively to be disposed in alignment therewith; and manually operable means carried by the reservoir unit for rotatively aligning and disaligning the tubular member and stem to and from a position wherein their respective air openings are in functional alignment, whereby passage of liquid out of the reservoir may be selectively controlled.

6. A reservoir unit for maintaining a constant liquid level in a lower body of liquid to which it may be coupled comprising, in combination: walls defining a closed liquid reservoir having a dependent tubular stem formed with respective bottom and lateral apertures, the interior of said stem being in communication with the reservoir, and a coupling unit disposed beneath said reservoir carrying external attachment means and having a dependent tubular extension disposed concentrically about said tubular stem and formed with a lateral aperture selectively alignable with the corresponding aperture of said stem by rotational movement of said extension.

7. A reservoir unit for maintaining a constant liquid level in a lower body of liquid to which it may be coupled comprising, in combination: light-transmitting walls defining a closed liquid reservoir having an upper inlet and closure therefor and also having a dependent tubular stem formed with respective bottom and lateral apertures, the interior of said stem being in communication with the reservoir, at least one indicating float of predetermined specific gravity disposed within said reservoir whereby changes of specific gravity in the reservoir liquid are shown by the position of said float within the reservoir, and a coupling unit disposed beneath said reservoir carrying external attachment means and having a dependent tubular extension disposed concentrically about said tubular stem and formed with a lateral aperture selectively alignable with the corresponding aperture of said stem by rotational movement of said extension.

References Cited in the file of this patent

UNITED STATES PATENTS

| | | |
|---|---|---|
| D. 150,328 | Appel | July 27, 1948 |
| 1,216,786 | Eaken | Feb. 20, 1917 |
| 1,781,597 | Pearson | Nov. 11, 1930 |
| 1,785,963 | Linebarger | Dec. 23, 1930 |
| 1,946,314 | Desmond | Feb. 6, 1934 |
| 2,139,476 | Townsend | Dec. 6, 1938 |
| 2,168,353 | Linebarger | Aug. 8, 1939 |
| 2,296,169 | Linebarger | Sept. 15, 1942 |
| 2,339,642 | Le Gro et al. | Jan. 18, 1944 |
| 2,342,480 | Mosher | Feb. 22, 1944 |
| 2,500,639 | Lermer | Mar. 14, 1950 |
| 2,543,724 | Iwanowski | Feb. 27, 1951 |

FOREIGN PATENTS

| | | |
|---|---|---|
| 299,816 | Great Britain | Oct. 18, 1928 |
| 320,026 | Great Britain | Sept. 30, 1929 |
| 328,774 | Great Britain | May 8, 1930 |
| 551,867 | Great Britain | Mar. 12, 1943 |